(No Model.)

R. P. SHOLL.
SELF OILING CAR AXLE.

No. 455,841. Patented July 14, 1891.

Witnesses
E. J. Slough
A. Keithley

Inventor
Raymond P. Sholl
By L. M. Thurlow
Atty.

UNITED STATES PATENT OFFICE.

RAYMOND P. SHOLL, OF PEORIA, ILLINOIS.

SELF-OILING CAR-AXLE.

SPECIFICATION forming part of Letters Patent No. 455,841, dated July 14, 1891.

Application filed April 6, 1891. Serial No. 387,721. (No model.)

*To all whom it may concern:*

Be it known that I, RAYMOND P. SHOLL, a citizen of the United States, residing at Peoria, in the county of Peoria and State of Illinois, have invented certain new and useful Improvements in Self-Oiling Car-Axles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in self-oiling car-axles.

The object of the invention is to provide an axle for mining or other cars, and such that the said axle may contain a large quantity of oil, and which oil may be fed to the wheel-bearings by suitable means for the purpose of keeping the said bearings lubricated continually.

Figure 1:
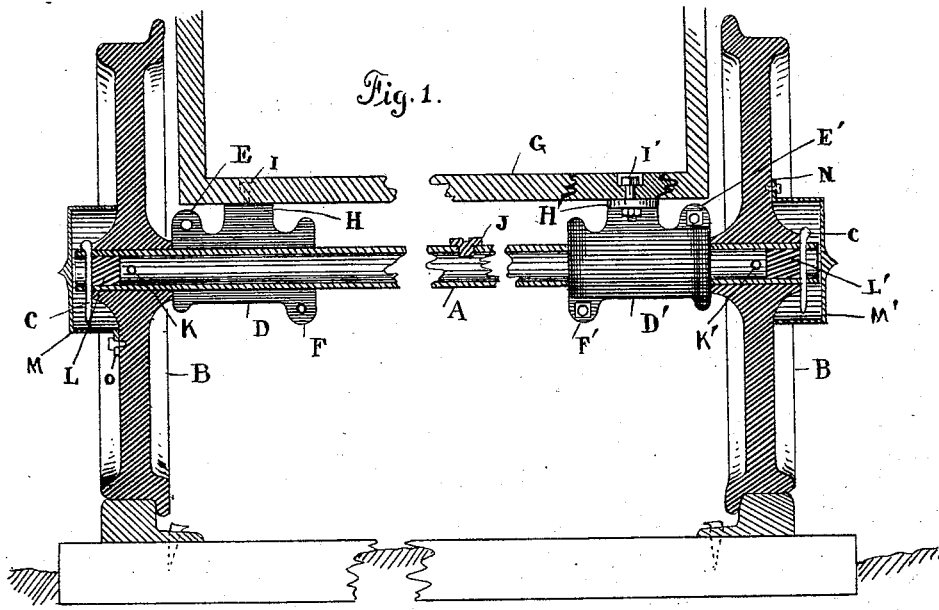
Figure 2:
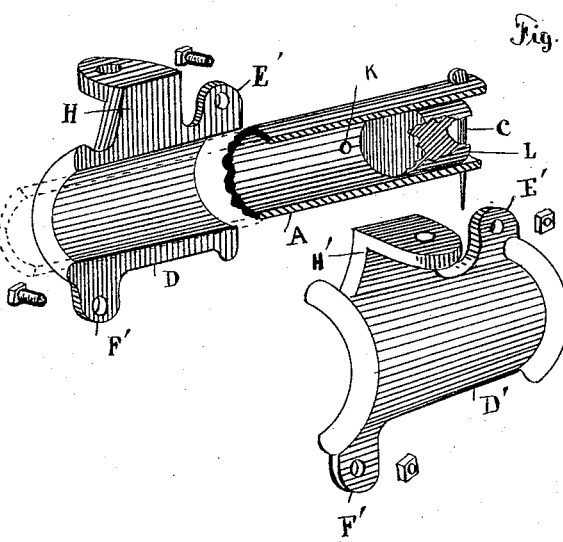
Figure 3:
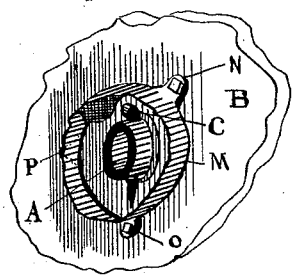

In the drawings hereto annexed, Figure 1 represents a sectional elevation of the axle, wheels, &c., for a mining-car. Fig. 2 is a perspective view of part of the axle and also two halves of a portion of the device used in supporting the box or receptacle. Fig. 3 is a perspective view of a portion of one wheel, showing the end of the axle and also a cap which is secured to the said wheel to protect the open parts from dust, &c.

A represents the axle of the car, which is simply a length of heavy piping, as shown, and each of whose extremities form the bearing for the wheels B B. The said wheels are kept on the said axle A by means of pins C C, which are simply thrust through a hole drilled through the axle or tubing A and at the extreme ends thereof. The said wheels are also held in place on the inside by a clamp formed of two half-cylindrical portions D and D', as shown, each of which is provided at its outer extremities on the top edge with a lug or ear E and E', while the lower inner edges are provided with lugs or ears F and F', and by means of these lugs or ears the said half-cylinders are bound together on the axle A by means of bolts passing through holes in the lugs or ears before mentioned. This forms a solid and substantial clamp around the said axle A, and the box or receptacle G is supported above the axle by means of a support or bracket H and H', which is cast with each of the said half-cylinders, and which, when the said portions are clamped together, as already described, forms a plane upon which the said receptacle is mounted and secured by the bolts I and I', as shown. A screw J is inserted in a threaded hole in the top of the axle A, and through the said hole the oil is poured in filling up the tube or axle. In each end of the tube or axle A is drilled a hole K, said hole being drilled in the side of said axle or tube and also being at or near the center of the bearing of the wheel, so that the oil is always being fed to the wheel-bearings or drawn out through the said hole K by the revolving of the wheels. A cylinder of cork, wood, or the like, L and L', is inserted in each end of the tube or axle behind the pin C or C', as shown, for the purpose of keeping the oil within the said tube. A metal cap may be also used to advantage, which is screwed on the end of the said axle, if desired.

In order that all dust and dirt may be kept from the bearing parts, a cap M and M' is placed over the end of the axle or tube and secured to the wheel by means of screws passing through ears N O P of the said cap M, and thus accomplishing the purpose for which said cap was intended.

I claim—

1. In a self-oiling car-axle, the said axle formed of a length of tubing and provided near either extremity with a clamp formed of two half-cylindrical portions D and D', and also near the extremities of the said axle a hole K, a cork or plug L, and a pin C, for the purposes set forth, and an opening on the top of axle for the reception of the oil, substantially as set forth and described.

2. In a self-oiling car-axle, the construction herein set forth and described, and consisting of the axle A, of tubing, on which the wheels revolve, and the said axle being held rigidly with the receptacle of the car by means of the clamp made of the two halves D and D', and constructed substantially in the manner and for the purposes set forth.

3. In a self-oiling car-axle, the construction herein set forth, and consisting of the axle A, of tubing, rigidly secured to the receptacle of the car by the clamp made of the two halves D and D', said axle being closed at both ends by plugs L and L', said plugs being held therein by pins C and C', respectively, and the said axle A being provided with a hole K and K' near either end inside of wheel-bearings, and constructed substantially as and for the purposes described and shown.

In testimony whereof I affix my signature in presence of two witnesses.

RAYMOND P. SHOLL.

Witnesses:
  R. H. LOVETT,
  ELMER J. SLOUGH.